United States Patent [19]
Jolly

[11] Patent Number: 6,132,859
[45] Date of Patent: Oct. 17, 2000

[54] METHOD FOR MANUFACTURING A SANDWICH CONSTRUCTION WITH HIGHLY RESILIENT CONDUCTIVE CORES AND RESULTING SANDWICH CONSTRUCTION

[76] Inventor: André Jean Jolly, 168 rue Saint-Martin, F-75003 Paris, France

[21] Appl. No.: 09/242,710

[22] PCT Filed: Aug. 20, 1997

[86] PCT No.: PCT/FR97/01508

§ 371 Date: Mar. 30, 1999

§ 102(e) Date: Mar. 30, 1999

[87] PCT Pub. No.: WO98/08271

PCT Pub. Date: Feb. 26, 1998

[30] Foreign Application Priority Data

Aug. 21, 1996 [FR] France .................................. 96 10454

[51] Int. Cl.[7] .................................. B32B 27/00; B32B 3/26
[52] U.S. Cl. .................................. 428/319.3; 428/304.4; 428/309.9; 428/344
[58] Field of Search .................................. 428/304.4, 309.9, 428/344, 319.3

*Primary Examiner*—Richard Weisberger
*Attorney, Agent, or Firm*—Young & Thompson

[57] ABSTRACT

A sandwich panel with conductive cores (10,12) interposed between layers (14,16,18) of foam insulating material, particularly of polyurethane, supporting elements (22) provided with at least one pin (26) for connection to the cores, particularly lamps (24) supplied with electrical energy by these cores connected to a source of current, characterized in that the insulating foam material has an elasticity threshold at least equal to the maximum pressure exerted by one of the pins of an element (22) inserted in the foam.

10 Claims, 3 Drawing Sheets

METHOD FOR MANUFACTURING A SANDWICH CONSTRUCTION WITH HIGHLY RESILIENT CONDUCTIVE CORES AND RESULTING SANDWICH CONSTRUCTION

CROSS REFERENCE TO RELATED APPLICATION

This is the 35 USC 371 national stage of international application PCT/FR97/01508 filed on Aug. 20, 1997, which designated the United States of America.

FIELD OF THE INVENTION

The present invention relates to panels with conductive cores disposed between layers of electrically insulating material.

BACKGROUND OF THE INVENTION

There are known panels with conductive cores which are used for example to supply lamps inserted in these panels. These panels comprise two layers of conductive material, generally a metallic sheet and three layers of insulating material so as to sandwich the conductive layers. The elements which are inserted in these panels comprise, either a single pin with two contact regions at two different heights corresponding to the depth of the conductive layers when the element is inserted to the hilt, or to separate pins each with a contact region of suitable height.

One application relates to use in stands at expositions.

Thus in this case, the exhibitors must display products by means of directed illumination and this from reduced numbers of electrical supply outlets. The panels with conductive cores require only one supply for an entire surface or even several surfaces in parallel or series.

Such panels have numerous other advantages, among which is the opportunity to change the position of one of the points of illumination or any other electrical component, the modification of the type of one of these components or again the addition or substraction of one of these components.

It is also known that such panels can be provided with coverings of different natures and different colors to harmonize these panels with the surroundings.

Another advantage of these panels is their light weight, which permits them to be handled and imparts great freedom to the arrangements.

These panels can also be cut and shaped, thus giving free rein to creativity.

The present applicant has also proposed conductive frames permitting associating such panels in series or rendering them portable.

There are known numerous processes for the production of such panels, disclosed in patent application WO 94/03947.

As a result of extensive research, the present invention provides a panel thus obtained, which overcome the following drawbacks.

Thus, if the panels presently produced operate and give complete satisfaction, there nevertheless remain imperfections over the long term concerning the contact.

In the course of time, an element, for example a single pin, inserted in the panel by means of its pin, becomes nonconductive. It suffices to reposition it immediately adjacently so that it will again operate. It will be noted that the pin serves both as a contact and as a conductor but also has a mechanical support for the element to which it is connected.

It is noted more particularly that the pins of complete circular cross-section can rotate in the panel, which, upon introduction, enlarges the penetration hole whilst permitting air to enter interrupting contact with the pin, the passage of current then forms aluminum oxide, forming an aluminate which is an insulator. This is facilitated by the fact that the pin is often touched with the fingers, thereby imparting supplemental moisture which accelerates the oxidation process.

It is therefore of interest to be able to improve the pressure of the panel in the horizontal plane to limit the penetration of air.

A new pin has been proposed in a related application so as to improve the contact capability of said pins and the present invention provides a panel which overcomes the problem of degradation of the quality of contact in the course of time, by means of characteristics adapted to be used in industrial production.

As would be imagined, if the initial contact is of poor quality, there results heating which, in the thermally insulating foam, leads to a buildup of heat, which degrades the foam and simultaneously degrades the quality of the contact and so on until the electrical contact ceases by loss of contact pressure.

SUMMARY OF THE INVENTION

To this end, the invention provides a process for the production of a sandwich panel with conductive cores interposed between layers of foam insulating material, particularly polyurethane, supporting elements provided with at least one connection pin to said cores, particularly lamps supplied by electricity by these cores connected to a current source, characterized in that the foam insulating material has an elasticity threshold at least equal to the maximum pressure exerted by one of the pins of an element inserted in said foam.

One embodiment of the process permitting achieving the result, consists in providing at least one sheet of material having elastic return properties, between the insulating foam and each conductive core, at least behind the core in the direction of introduction of the pin of the element and more particularly between the insulating foam and each surface of each conductive core.

According to a modification, the sheet of material having elastic return properties is integrated and jointly produced with the insulating foam.

According to another embodiment, the sheet of material having elastic recovery properties, integrated and produced with the insulating foam, is a layer of elastomeric balls embedded in the upper layer of the insulating foam, facing the conductive sheet.

A modification consists in using as the sheet of material having elastic recovery properties, the layer of cement serving to integrate the conductive core and the foam.

The panel also provides a multi-sheet conductive layer of a material having elastic recovery properties and of conductive material.

In another case, the panel comprises a loaded conductive foam, or a single or multi-sheet conductive layer, of conductive elastomeric material.

BRIEF DESCRIPTION OF THE DRAWINGS

The present invention will be described hereafter with respect to a particular non-limiting example, with reference to the accompanying drawings, in which the figures show.

DETAILED DESCRIPTION OF THE INVENTION

Figure 1:
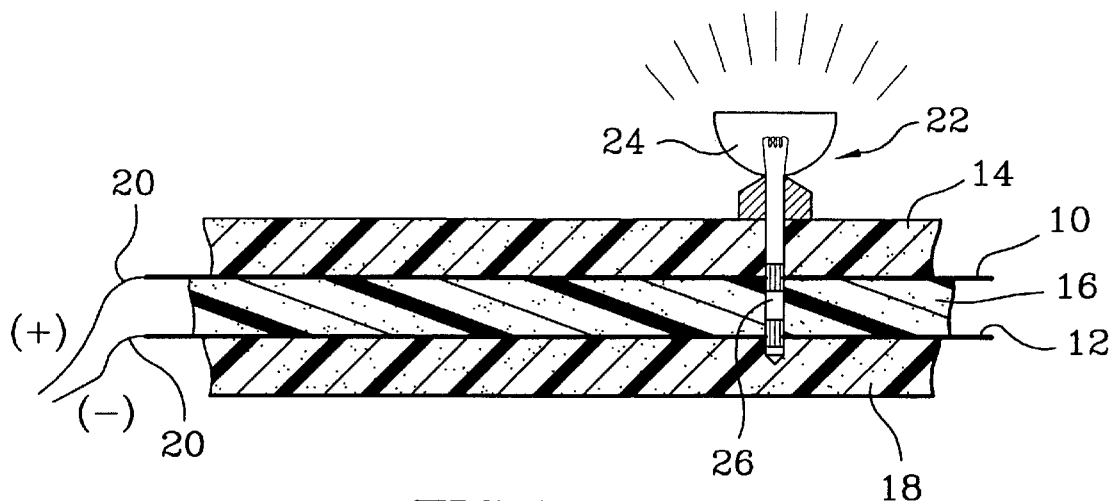
FIG. 1, a cross-sectional view of a first embodiment of a highly resilient panel according to the invention, FIG. 2, a detailed view of the penetration of a pin into the panel of FIG. 1, FIG. 3, a view of a modified embodiment of a panel according to the invention, FIG. 4, a half detail view of the penetration of a pin into the panel of FIG. 3, FIG. 5, a view of a second modification of a sandwich panel, and FIG. 6, a view of a third modification of a sandwich panel.

In FIG. 1, there is shown a sandwich panel with conductive layers 10, 12 interposed each between two of the three insulating layers 14, 16 and 18.

The connection with the electrical circuit is symbolized by a double wire 20, given that generally speaking this is Very Low Voltage Safety, VLVS, particularly 12 or 24 V.

An element 22, of the single pin type to simplify the drawing, is inserted in the panel. This element is a lamp 24 with a pin 26 of circular section. As the element 22 must be able to be retracted without leaving any significant trace, it will be understood that the diameter is small.

In the illustrated embodiment, the parameters which characterize the insulating material are important.

Thus, to permit an installation at expositions or public places in general, it is necessary that the panel be compatible with the existing standards, which is to say for example resistant to the so-called incandescent wire test and/or resistant to tests of the Class M1, which indicates a certain resistance to fire and giving off non-toxic products.

Also, the panels are produced from suitable foams, in this instance polyurethane.

More particularly, the foams have generally a density of 80 to 100 kg/m$^3$ and above all, so as to obtain the desired results, these foams have for example:

an elasticity threshold of 3 bars, which is to say that a slab of foam subjected to a surface pressure of 3 bars remains within the elastic limit and leaves no residual imprint, and a resistance to compression of 7 bars, which is to say that this same slab of foam, subjected to a pressure of 7 bars, has a residual plastic deformation of 10% of the deformation engendered by this pressure.

Such parameters give to the sandwich panels thus produced durable contact properties.

Thus, in the case of the invention, after penetration of the pin, the foam has the tendency to return the metallic sheet in the direction of the arrow 28, in the direction opposed to that of penetration, and to press this metallic sheet against the pin.

In the case of the prior art, the foam not having these characteristics, the pin by its own pressure, crushed the foam with plastic deformation, whilst pressing the metallic sheet against these plastically deformed edges and, the elastic return effect being absent, simply by the play of differential expansion of the various materials, one of the conductive portions was no longer disposed against a sufficient contact surface or with a sufficient contact pressure, to pass the quantity of current necessary for illuminating the element.

It is thus necessary that the foam have an elasticity threshold higher than the maximum pressure exerted by the pin of the element which it supports in the foam at this point.

Figure 2:
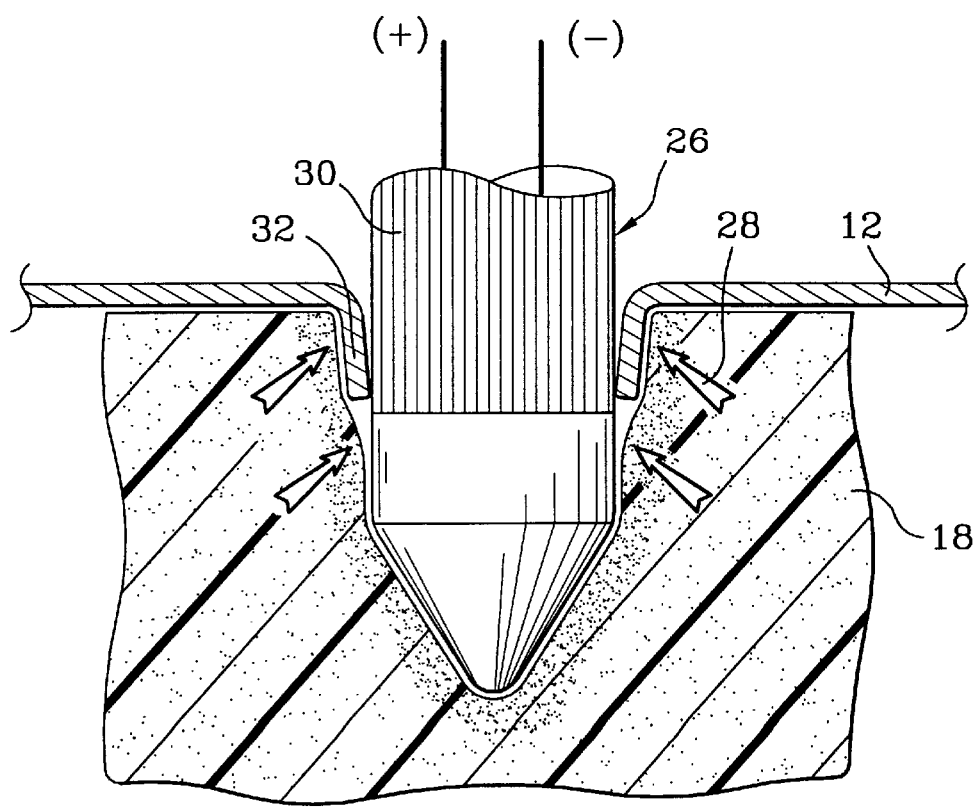

In FIG. 2, there is shown in detail the end of the pin 22 with the conductive portion 30. The sheet of conductive material 12 is perforated by the pin 26, which bends back the peripheral portions 32 of the sheet in the direction of introduction, between the foam 18 and the body of the pin 26.

It is necessary that the foam exert a pressure, in the horizontal direction, on the portions 32 of the sheet to press against them the conductive portion, as shown by the arrows 28.

The foam must have low resistance to compression in the horizontal direction, at least immediately adjacent the conductive layer.

Figure 3:
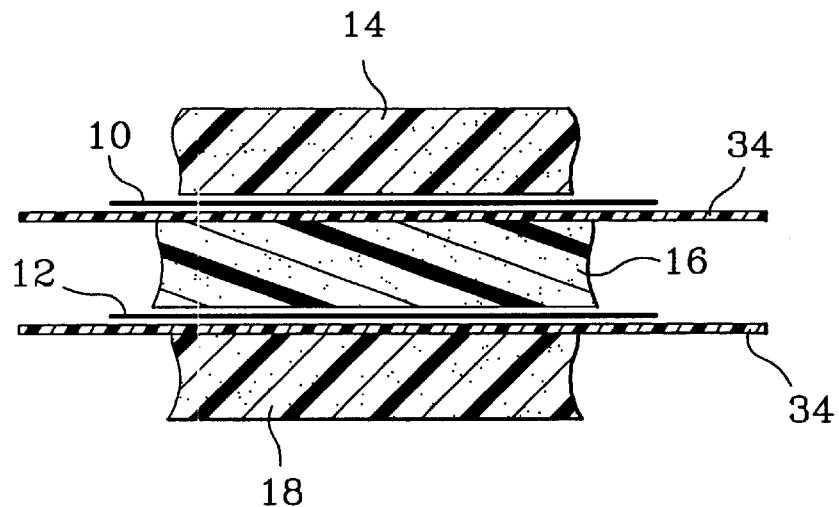

According to a particular embodiment shown in FIG. 3, it is provided to interpose, between the conductive sheets and the foam of a conductive panel, a sheet 34 of a material having elastic return properties such as an elastomer, below the conductive sheet in the direction of introduction.

Figure 4:
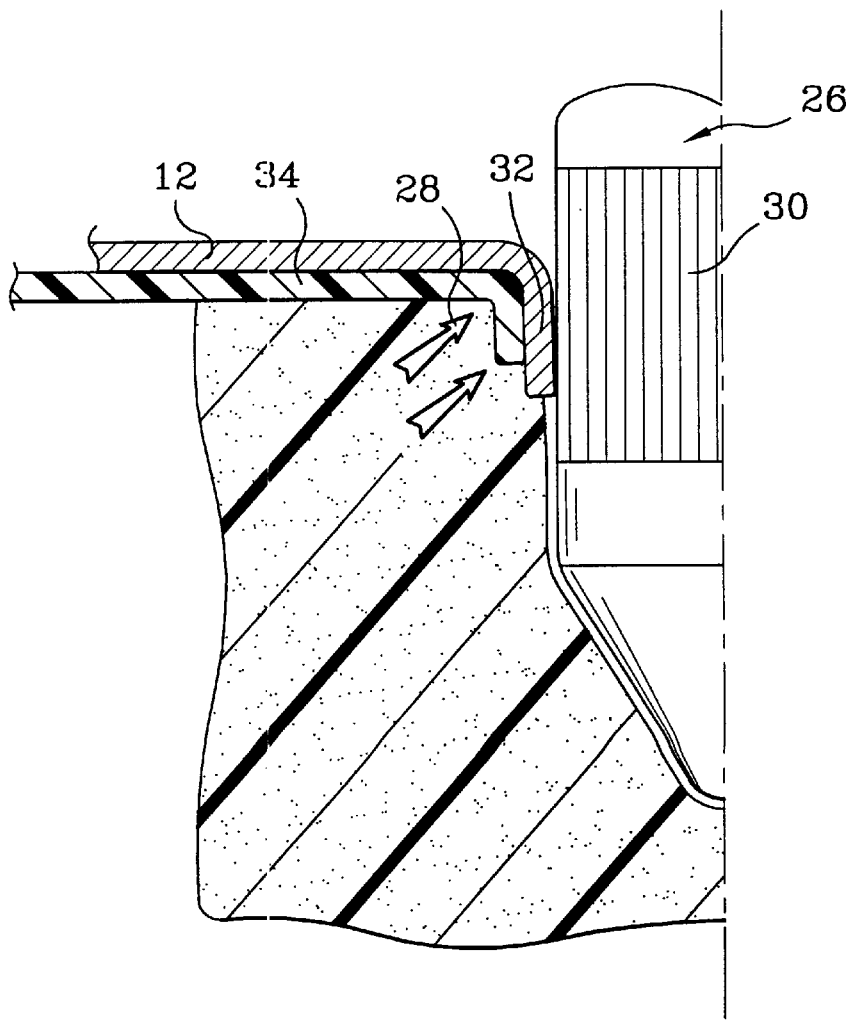

In FIG. 4, there can be seen the obtained result, namely a force exerted on the conductive sheet to press it against the conductive portion of the body of the pin 26.

Thus, the peripheral edge of the hole of the elastomeric sheet left by the penetration of the pin acts as an elastic bracelet and constrains the portions 32 of the conductive metal sheet to press them against the body of the pin.

The contact is of high quality, because the pressure exerted is great and simultaneously over a sufficient surface.

Figure 5:
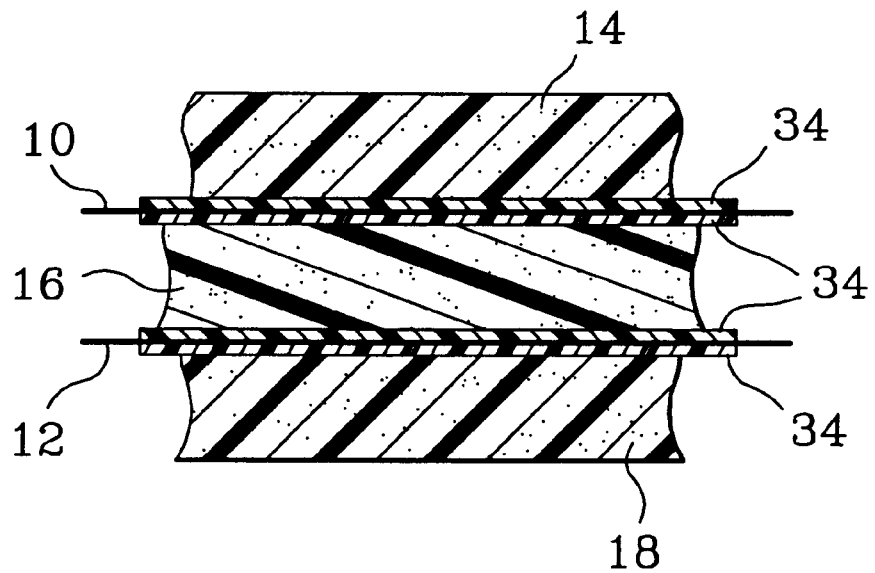

So as to provide a completely reversible panel, it is possible to provide a same multi-sheet conductive layer as shown in FIG. 5, in its simplest embodiment.

In a more complicated embodiment, there are alternately arranged a conductive metal sheet, an elastomeric layer, a metallic sheet, an elastomeric layer, a metallic sheet. The thicknesses must be such that the thickness of this conductive layer have a reasonable thickness, particularly to remain easy to pierce.

With such an arrangement, the contact surface is increased with the same horizontal contact pressure.

Figure 6:
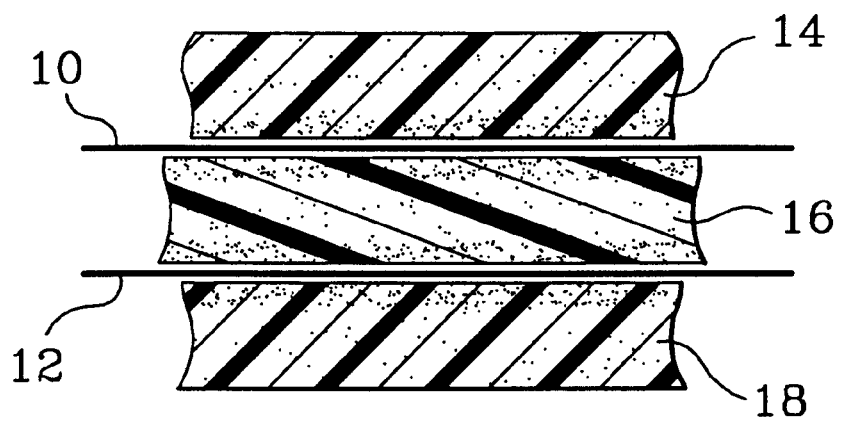

This sheet 34 can also be integrated with the surface of the insulating layer, facing the conductive layer, for example by integrating during production of the layer of insulating foam, elastomeric balls, at least in the surface of this layer, facing the conductive layer. A schematic cross-section of this embodiment is shown in FIG. 6.

This layer 34, of material having elastic return properties, can be the layer of cement itself which is generally used to secure the different layers of the sandwich panel together, provided in a sufficient thickness, in combination with conductive metallic sheets.

The metallic sheets can be omitted by use of conductive cements. In this case, the cement ensures both the elastic return effect and electrical conduction.

Conductive elastomers can also be used.

In all the above examples, it will be noted that the effect of sealing generated by the elastomeric material by marked resistance to horizontal compression, considerably limits the penetration of air and the risk of oxidation.

Because of this, there is also the possibility to provide an elastomer which expands with temperature because, in the contact region, the very low heat transfer can be sufficient to give rise to expansion of the elastomer and thereby to ensure improved sealing with increased contact pressure.

As a modification, use can be made of loading material having volumetric expansion capacity, embedded in the elastomer and/or in the foam.

In certain modifications described above, it was noted that the very intimate connection between the conductive sheet and the elastomer permits forming the conductive sheet into the cone of penetration, simultaneously with the elastomeric sheet, which again improves the qualities and durability of the electrical connection.

Panels have been made which give complete satisfaction with the following parameters: polyurethane or polystyrene foam as the insulating layer and a conductive layer comprising a sandwich of an aluminum sheet, 5 to 100 µm, a sheet of polyurethane or of polyamide of 50 to 500 µm and an aluminum sheet, 5 to 100 µm. This combination is repeated as a function of the desired number of layers.

There can also be produced panels having numerous superposed layers to handle different independent electrical circuits.

What is claimed is:

1. A sandwich panel comprising:
    conductive layers interposed between layers of insulating foam;
    supporting elements provided with at least one pin for connection to said conductive layers;
    said supporting elements being supplied with electrical energy by said conductive layers connected to a source of current; and
    wherein the insulating foam has an elasticity threshold at least equal to the maximum pressure exerted by one of the pins of an element inserted in said insulating foam.

2. The sandwich panel according to claim 1, wherein the insulating foam is polyurethane, and the elements are lamps.

3. The sandwich panel according to claim 1, further comprising at least one sheet of material having elastic recovery properties interposed between the insulating foam and each conductive layer, at least on the far side of the conductive layer in the direction of introduction of the pin of the element.

4. The sandwich panel according to claim 3, wherein a sheet of material having elastic recovery properties is interposed between the insulating foam and each surface of each conductive layer.

5. The sandwich panel according to claim 3, wherein the sheet of material having elastic recovery properties is integrated and produced with the insulating foam.

6. The sandwich panel according to claim 5, wherein the sheet of material having elastic recovery properties, integrated and produced with the insulating foam, is a layer of balls of elastomer embedded in the upper layer of the insulating foam, facing the conductive layer.

7. The sandwich panel according to claim 3, wherein the sheet of material having elastic recovery properties is a layer of glue serving to integrate the conductive layer and the insulating foam.

8. The sandwich panel according to claim 3, wherein the conductive layer comprises a multi-sheet assembly of material having elastic return properties and conductive material.

9. The sandwich panel according to claim 3, wherein the conductive layer is a conductively loaded foam.

10. The sandwich panel according to claim 3, wherein at least one of the sheet of material having elastic recovery properties and the insulating foam is loaded with material having three-dimensional expansion properties under the influence of a temperature increase.

\* \* \* \* \*